United States Patent [19]

Fujisawa et al.

[11] Patent Number: 5,418,766
[45] Date of Patent: May 23, 1995

[54] APPARATUS FOR DETECTING THE PRESENCE OF AN OPTICAL DISK

[75] Inventors: Shinichi Fujisawa, Fussa; Yoshiyuki Otsuka, Akishima; Yasushi Hosono, Kamifukuoka, all of Japan

[73] Assignee: Teac Corporation, Tokyo, Japan

[21] Appl. No.: 164,474

[22] Filed: Dec. 9, 1993

[30] Foreign Application Priority Data

Dec. 28, 1992 [JP] Japan ................ 4-349358

[51] Int. Cl.$^6$ ................ G11B 7/00
[52] U.S. Cl. ................ 369/54; 369/44.25
[58] Field of Search ............ 369/54, 44.25, 44.27, 369/44.41, 44.29, 58, 44.34

[56] References Cited

U.S. PATENT DOCUMENTS 5,003,521 3/1991 Yoshida et al. ............ 369/44.25
5,187,696 2/1993 Ishii et al. ............ 369/44.34 X

FOREIGN PATENT DOCUMENTS 62-76061 4/1987 Japan .
63-268159 11/1988 Japan .
2-289925 11/1990 Japan .
4-93917 8/1992 Japan .
4-255963 9/1992 Japan .

Primary Examiner—Aristotelis Psitos
Assistant Examiner—Thang V. Tran
Attorney, Agent, or Firm—Michael N. Meller

[57] ABSTRACT

An optical disk apparatus which can exactly determine whether or not an optical disk is loaded therein in a short time. The optical disk apparatus determines the presence of the optical disk having a transparent film provided on a recording surface by means of a focusing performed by an optical pick-up. The optical pick-up receives a reflected light beam reflected by the optical disk and splits the received light beam into at least two light beams so as to output signals corresponding to each of the split light beams. A controlling unit controls a movement of the optical pick-up in a direction perpendicular to the recording surface of the optical disk. A signal generating unit generates a focus error signal when signals corresponding to the reflected light beam are supplied by the optical pick-up. A determining unit determines whether or not the optical disk is loaded in the optical disk apparatus by counting the number of the focus error signals. The determination is carried out while the optical pick-up travels in a single direction.

6 Claims, 4 Drawing Sheets

APPARATUS FOR DETECTING THE PRESENCE OF AN OPTICAL DISK

BACKGROUND OF THE INVENTION

The present invention relates to an optical disk apparatus which can determine, by using an optical pick-up, whether or not an optical disk is loaded therein.

A conventionally used optical disk, such as a CD (compact disk), LD (laser disk) and magneto-optical disk, is loaded in an optical disk apparatus, and the optical disk is clamped by a disk clamper or a stabilizer so as to be rotated therein. Generally, a high grade type optical disk apparatus uses a large size disk clamper or stabilizer because the large size clamper or stabilizer can easily prevent a deflection of rotation of the optical disk.

When operating an optical disk apparatus, an optical disk must be loaded beforehand. Accordingly, in the optical disk apparatus, it is determined whether or not an optical disk has been loaded before starting an operation. One of the methods to determine whether or not an optical disk is loaded is an optically determining method using an existing optical pick-up.

Japanese Laid-Open Patent Application No. 2-289925 discloses a method in which a light beam is radiated from an optical pick-up and a presence of an optical disk is determined by detecting a light beam reflected by the optical disk.

Generally, in optical disk apparatuses, focusing of a light beam is performed by moving an optical pick-up in a direction perpendicular to a surface of the optical disk. If the focusing does not succeed in a predetermined period of time, a focus error signal is generated. Accordingly, when a focusing is performed in a state where an optical disk is not loaded, a focus signal is generated. Japanese Laid-Open Patent Applications No. 62-76061, No. 63-268159 and No. 4-255963 disclose a method in which it is determined whether or not an optical disk is loaded by detecting the above-mentioned focus error signal.

When focusing by means of an optical pick-up, an S-curve detection signal is detected. A zero-cross signal of the S-curve detection signal corresponds to a focused position of the pick-up. Japanese Laid-Open Utility Model Application No. 4-93917 discloses a method in which it is determined that an optical disk is not loaded when the zero-cross signal is not generated. That is, it is determined whether or not an optical disk is loaded by judging a presence of the zero-cross signal at the time when a focussing is performed.

Additionally, other methods are known, in which, for example, a micro switch, which is operated by mechanical means and outputs a detection signal, or a reflection type photo-interrupter is provided to determine whether or not an optical disk is loaded.

However, when determining a presence of an optical disk by detecting the focus error signal by using an optical pick-up, there is a problem in that the determination takes a long time. Additionally, when the optical disk is rotated by means of a large size disk clamper or stabilizer, there is a problem in that an erroneous determination, which is a determination that an optical disk is loaded, may be made despite there being no optical disk loaded, because a light beam is reflected by the clamper or the stabilizer, which condition prevents a generation of the focus error signal.

In the above case, a matting agent may be applied to the disk clamper or stabilizer, or a notch may be provided on a stabilizer at a position facing the pick-up. However, these means need an additional manufacturing process, resulting in a manufacturing cost thereof increasing.

Additionally, in the method in which a micro switch or reflection type photo-interrupter is used, there is a problem in that a manufacturing cost is increased by additional parts to be provided.

SUMMARY OF THE INVENTION

It is a general object of the present invention to provide an improved and useful optical disk apparatus in which the above-mentioned problems are eliminated.

A more specific object of the present invention is to provide an optical disk apparatus which can exactly determine, in a short time, whether or not an optical disk is loaded therein.

In order to achieve the above-mentioned objects, there is provided according to the present invention an optical disk apparatus which determines whether or not an optical disk having a transparent film provided on a recording surface is loaded by means of a focusing performed by an optical pick-up, the optical disk apparatus comprising:

an optical pick-up which receives a reflected light beam reflected by the optical disk and splits the received light beam into at least two light beams so as to output signals corresponding to each of the split light beams;

a controlling unit for controlling a movement of the optical pick-up in a direction perpendicular to the recording surface of the optical disk;

a signal generating unit for generating a focus error signal when signals corresponding to the reflected light beam are supplied by the optical pickup; and a determining unit for determining whether or not the optical disk is loaded in the optical disk apparatus by counting the number of the focus error signals, wherein the determination made by the determining unit is carried out while the optical pick-up executes a single direction motion.

According to the present invention, a focus error signal can be generated at least at the recording surface and the transparent film surface of the optical disk within a single direction motion of the optical pick-up. If there is no optical disk loaded, only one focus error signal is generated at the clamper or stabilizer surface. Therefore, it can be determined exactly and in a short time whether or not the optical disk is loaded in accordance with a count value of the focus error signal which is counted by the determining unit.

Other objects, features and advantages of the present invention will become more apparent from the following detailed description when read in conjunction with the accompanying drawings.

DETAILED DESCRIPTION OF THE PREFERRED EMBODIMENT

Figure 1:
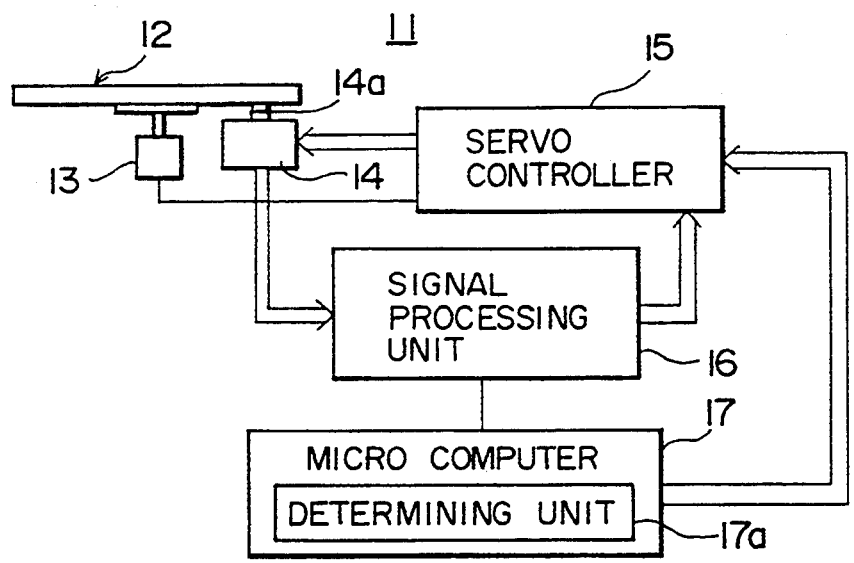
FIG. 1 is an illustration showing a structure of an essential part of an embodiment of an optical disk apparatus according to the present invention.

A description will now be given, with reference to FIG. 1, of a structure of an essential part of an embodiment of an optical disk apparatus according to the present invention. In an optical disk apparatus shown in FIG. 1, an optical disk 12 is rotated by a spindle motor 13. The optical disk 12 comprises a recording layer 12a on which digital data is recorded and a transparent film layer 12b which protects the recording layer from damage (refer to FIGS. 3A and 3B).

An optical pick-up (optical head) 14 is positioned underneath the optical disk 12. The optical pick-up 14 radiates a laser beam supplied by a semiconductor laser device (not shown in the figure) to the optical disk 12 via an actuator lens 14a. The radiated laser beam is reflected by a surface of the optical disk, and the reflected laser beam is incident upon a half or quadro split detector to be detected.

A servo controller 15 controls a rotation of the spindle motor. The servo controller 15 also controls a movement of the actuator lens 14a of the pick-up 14 so that when performing a focusing the pick-up 14 is moved perpendicular to the surface of the optical disk 12 and when performing a tracking the pick-up 14 is moved parallel to the surface of the optical disk.

A signal processing unit 16 generates a tracking error signal and focus error signal in accordance with the signal supplied by the optical pick-up 14, and sends them to the servo controller 15 for performing a tracking and focusing. The signal processing unit 16 sends the focus error signal to a determining unit 17a of a micro computer 17. The micro computer 17 sends a control signal to the servo controller 15 in accordance with a determination of the determining unit 17a which determines whether or not an optical disk is loaded.

Figure 2:
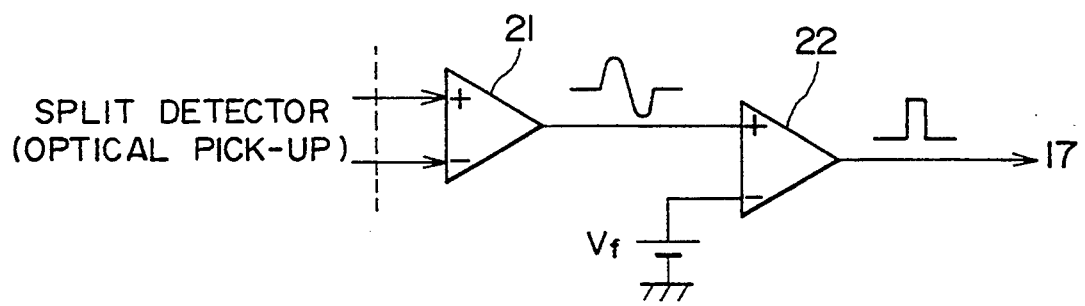
FIG. 2 is a circuit diagram of a signal processing unit of FIG. 1.

As shown in FIG. 2, two signals supplied by the detector of the optical pick-up 14 are input to a differential amplifier 21, and a signal having a so-called S-curve wave form is generated. The S-curve wave form signal is then input to another differential amplifier 22, and converted into a focus error signal having a square wave form. The focus error signal is sent to the determining unit 17a from the signal processing unit 16.

Figure 3A:
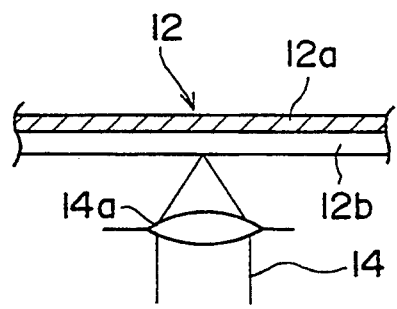
FIGS. 3A and 3B are illustrations for explaining a focusing performed in the embodiment of FIG. 1.
Figure 3B:
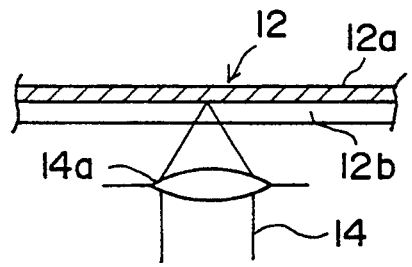

FIGS. 3A and 3B are illustrations for explaining the above-mentioned focusing operation. When the actuator lens 14a of the optical pick-up 14 is moved upward from the lowermost position in a state where the optical disk is loaded, the laser beam is focused, as shown in FIG. 3A, on the surface of the transparent film layer 12b of the optical disk 12. At this time, a first S-curve wave form signal is generated in the differential amplifier 21. As the actuator lens 14a is moved further upward, the laser beam is focused on the surface of the recording layer 12a, and a second S-curve wave form signal is generated.

When the optical disk is not loaded, the actuator lens 14a moves further upward, and the laser beam is focused on the clamper which clamps the optical disk or the stabilizer which results in generation of one S-curve wave form signal.

Figure 4:
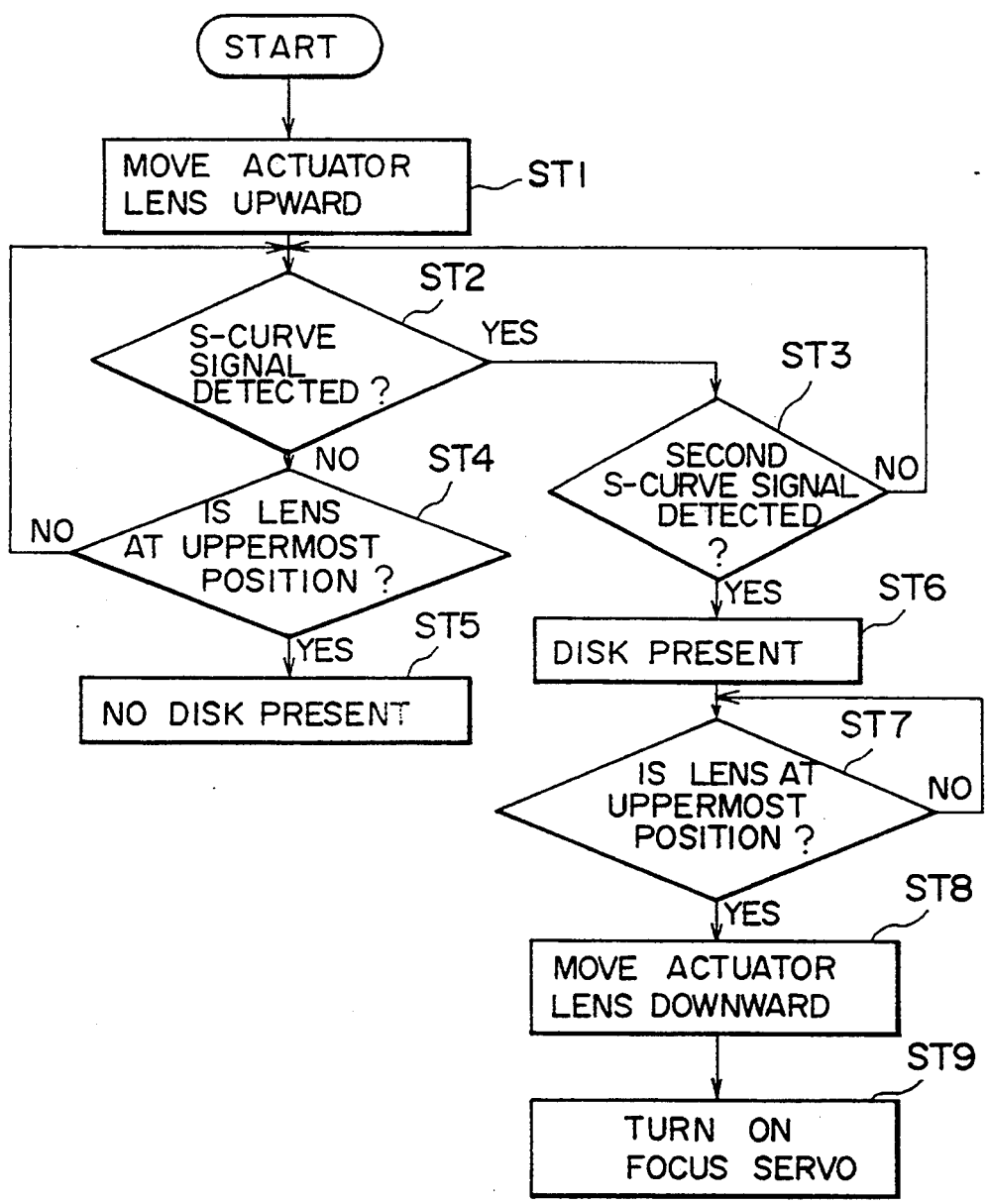
FIG. 4 is a flow chart of a disk detecting operation performed in the embodiment of FIG. 1.
Figure 5:
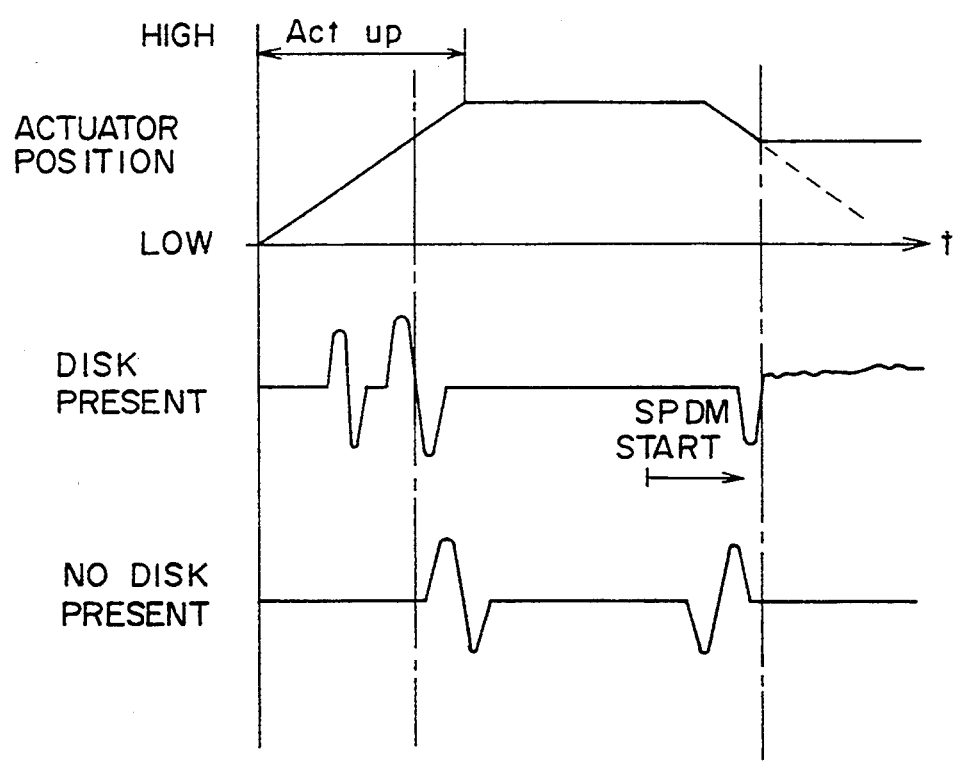
FIG. 5 is a time chart for explaining a relationship between a position of an actuator and a generation of an S-curve wave form signal.

A description will now be given, with reference to a flow chart of FIG. 4, of a detecting operation of the optical disk in the above-mentioned embodiment. It should be noted that a time chart of FIG. 5 shows a timewise relationship between a position of the actuator lens (optical pick-up) and generation of the S-curve wave form signals.

When the detecting operation of the optical disk is started, an operation of movement of the actuator lens 14a begins move, in step 1 (hereinafter "step" is abbreviated "ST"), the motion being in a direction toward the optical disk. Before the operation is started, the actuator is positioned at a position farthest from a disk attaching surface.

After movement of the actuator lens has started, it is judged, in ST2, whether or not an S-curve wave form signal is detected. If a first S-curve wave form signal is detected upon focusing of the laser beam on a reflective surface, the routine proceeds to ST3 where it is judged whether or not a second S-curve wave form is detected. These S-curve wave form signals are converted into square wave form signals, as shown in FIG. 2, and are sent to the determining unit 17a of the micro computer 17. The determining unit 17a count the square wave form signal. If the second S-curve is not detected by the time the actuator lens 14a reaches the upper most position, it is determined by the determining unit 17a that there is no optical disk present, and the routine proceeds to ST5 where a signal representing that there is no disk is sent to the servo controller 15. In this case, the detected first and only S-curve wave form signal corresponds to a signal generated when the laser beam is focused on the surface of the clamper or the stabilizer.

On the other hand, if it is judged, in ST3, that a second S-curve wave form signal is detected, the routine proceeds to ST6 where it is determined by the determining unit 17a that an optical disk is present. The actuator lens continuously moves in the same direction, and it is judged, in ST7, whether or not the actuator lens 14a has reached at the uppermost position. If it is judged that the actuator lens 14a has reached at the uppermost position, the actuator lens is then moved downward, in ST8, until it reaches to the position where the second S-curve wave form signal was detected. In ST9, the spindle motor 13 is rotated and a focus servo is put into operation so as to perform a pull-in of a focus.

It should be noted that the movement of the actuator lens 14a (optical pick-up) is controlled by the servo controller 15 in accordance with a command supplied by the micro computer 17.

As mentioned above, the determining unit 17a determines that the optical disk 12 is present when two focus error signals, which are square wave form signals corresponding to the S-curve wave form signals, are counted, and when the count value is less than 2, it is determined that the optical disk 12 is not present.

According to the present embodiment, even though a large size clamper is used, an erroneous focus servo is not performed against the clamper. Therefore, an exact determination of the presence of the optical disk can be performed. Additionally, since no additional parts such as a micro switch or a sensor to detect a presence of the optical disk, there is no cost increase due to an increase in number of parts.

Further, since detection of the presence of the optical disk can be performed by a single direction motion of the actuator lens 14a toward the optical disk from the lowermost position, the determination of the presence of the optical disk is performed in a short time.

Figure 6:
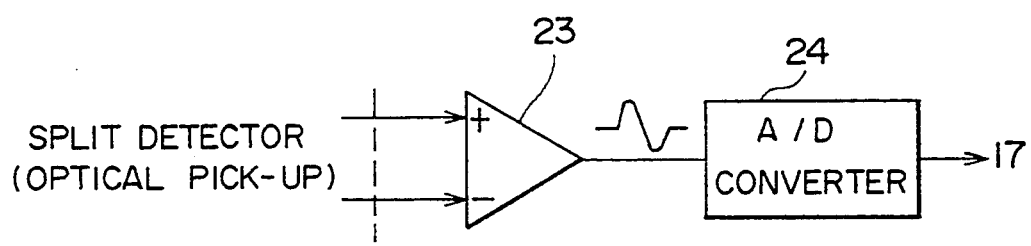
FIG. 6 is another example of a signal processing unit of FIG. 1.
Figure 7:
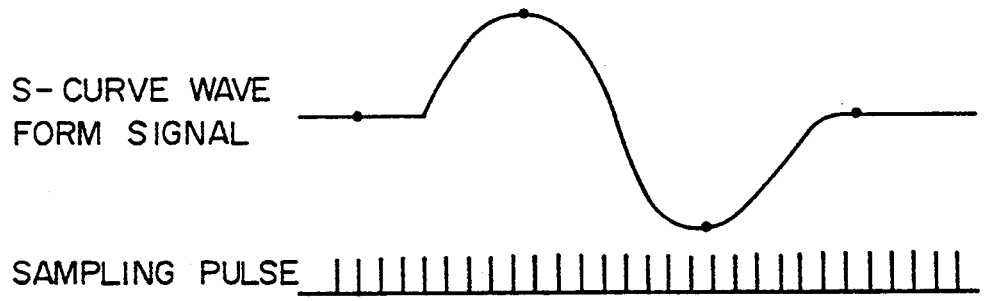
FIG. 7 is an illustration for explaining a digitalization of the S-curve wave form signal.

FIG. 6 shows another example of a circuit for generating a focus error signal shown in FIG. 2. In the example of FIG. 6, similarly to the example of FIG. 2, signals supplied by the optical pick-up 14 are input to a differential amplifier 23 so as to extract an S-curve wave form signal. The S-curve wave form signal is then input to an A/D converter 24, and the signal is converted into a digital signal. The digitalization is performed, as shown in FIG. 7, by sampling each point of the S-curve wave form signal by using a sampling pulse.

The digital signal is sent to the micro computer 17 from the A/D converter 24, and temporarily stored in a memory. When it is determined by the determining unit 17a that two digital signals have been detected, it is determined that the optical disk 12 is present.

The present invention is not limited to the specifically disclosed embodiments, and variations and modifications may be made without departing from the scope of the present invention.

What is claimed is:

1. An optical disk apparatus which determines, by means, of focusing a light beam performed by an optical pick-up, whether or not an optical disk having a transparent film provided on a recording surface is loaded, the optical disk apparatus comprising:
   an optical pick-up which receives a reflected light beam reflected by said optical disk and splits said reflected light beam into at least two split light beams so as to output signals corresponding to each of the split light beams;
   controlling means for controlling movement of said optical pick-up in a direction perpendicular to said recording surface of said optical disk;
   signal generating means for generating focus error signals when signals corresponding to said reflected light beam are supplied by said optical pick-up; and
   determining means for determining, by counting the number of said focus error signals, whether or not said optical disk is loaded in said optical disk apparatus,
   wherein the determination made by said determining means is carried out while said optical pick-up executes a single direction motion.

2. The optical disk apparatus as claimed in claim 1, wherein said signal generating means comprises a first differential amplifier which outputs, when signals corresponding to said reflected light beam are input, an S-curve waveform signal; and a second differential amplifier which outputs, when said S-curve waveform signal is supplied, a focus error signal which is a square wave form signal.

3. The optical disk apparatus as claimed in claim 1, wherein said signal generating means comprises a first differential amplifier which outputs, when signals corresponding to said reflected light beam is input, an S-curve waveform signal; and an A/D converter which outputs, when said S-curve waveform signal is supplied, a focus error signal which is a digital signal.

4. The optical disk apparatus as claimed in claim 1, wherein said determining means determines that said optical disk is not loaded when less than two focus error signal are counted while said optical pick-up travels from a position farthest from an optical disk loading position to a position closest to said optical disk loading position.

5. The optical disk apparatus as claimed in claim 1, wherein said determining means determines that said optical disk is loaded when two focus error signals are counted while said optical pick-up travels from a position farthest from an optical disk loading position to a position closest to said optical disk loading position.

6. The optical disk apparatus as claimed in claim 5, wherein when it is determined by said determining means that said optical disk is loaded, said controlling means effects control so as to move said optical pick-up from the position closest to the optical disk loading position to the position where the second error signal was counted by said determining means.

* * * * *